Dec. 24, 1957  G. LONG ET AL  2,817,284
PUFFING GUN SHOCK ABSORBING SYSTEM
Filed Jan. 3, 1956  2 Sheets-Sheet 1

INVENTORS
GEORGE LONG
TAKUZO TSUCHIYA
BY
William C. Babcock
ATTORNEY

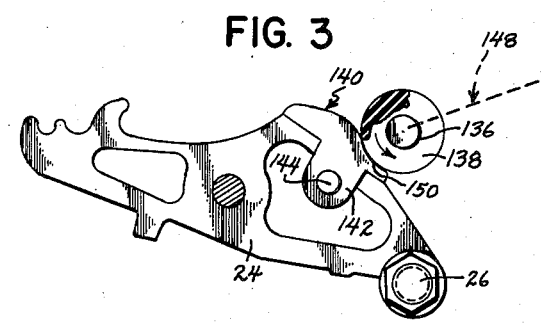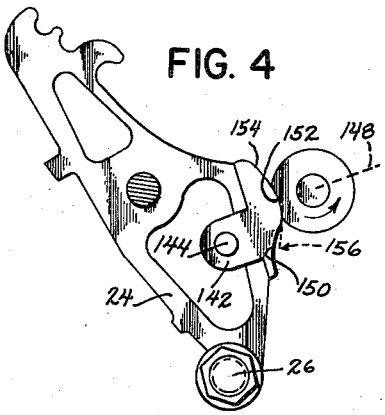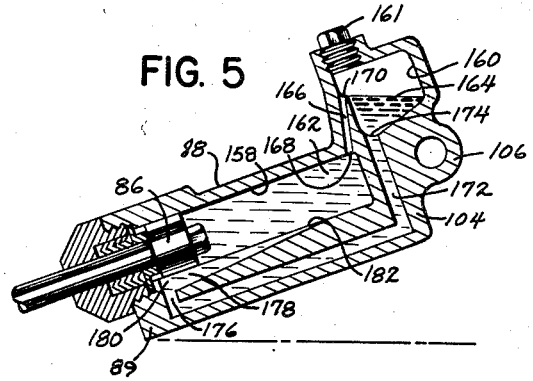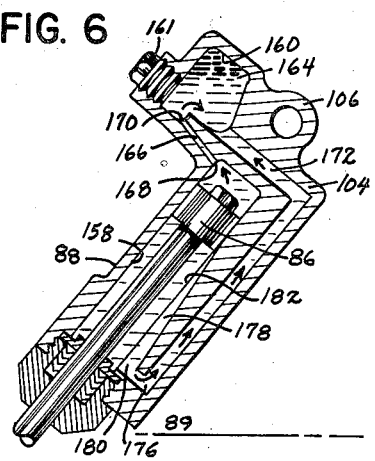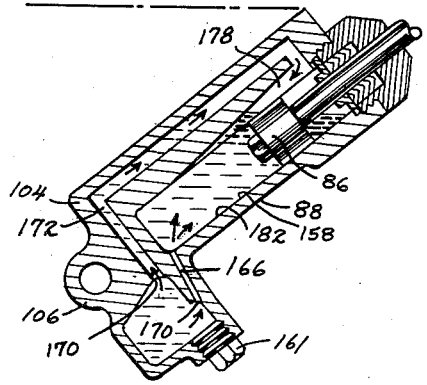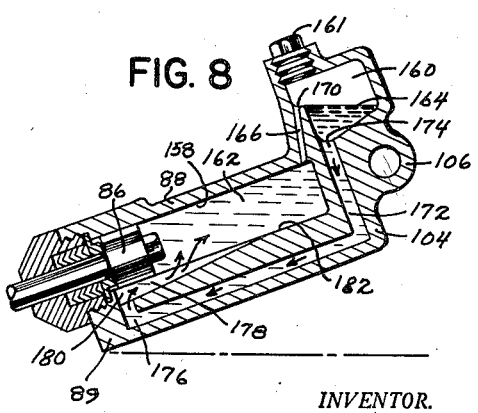

United States Patent Office 2,817,284
Patented Dec. 24, 1957

2,817,284

PUFFING GUN SHOCK ABSORBING SYSTEM

George Long and Takuzo Tsuchiya, Minneapolis, Minn., assignors to General Mills, Inc., a corporation of Delaware Application January 3, 1956, Serial No. 557,073

14 Claims. (Cl. 99—238)

The present invention relates to puffing guns and more particularly to improved shock absorbing means for the rapidly opening covers of such guns.

Prior art puffing guns have included some mechanisms for cushioning the opening movement of the puffing gun cover. These covers open very rapidly under the cooking pressures used in such guns, and one of the objectives of such a gun is to open the cover so rapidly that the contents are puffed during the resulting rapid pressure change. In normal food manufacturing operations such puffing guns are loaded, operated, and then opened a very large number of times in the course of a working day. In some cases the operation is substantially continuous. At each operation the cover is thrown violently open under the internal pressures which are being released and the kinetic energy of the parts during this opening movement must be absorbed harmlessly in some manner.

Prior shock absorbing arrangements have in some cases given rise to substantial maintenance problems. Such systems have often involved relative arrangements and locations of the parts which contribute stresses in a plurality of directions. Thus the shock absorber not only has to resist the direct opening movement of the cover, but in some cases has to resist torsional or bending moments or stresses.

Prior devices have also used shock absorber cylinder assemblies in which damping fluid is forced through restricted passages to cushion the opening movement of the cover. Some of these prior damping arrangements have failed or operated with decreased efficiency as the number and frequency of its operations is increased under modern production conditions.

With these problems of the prior art in view, it is one object of the present invention to provide a puffing gun having an improved shock absorbing mechanism.

Another object is the provision of a puffing gun and shock absorber assembly in which all possible bending and torsional stresses are eliminated.

A further object is the provision of an improved shock absorber cylinder assembly for such a puffing gun.

Still another object is the provision of a puffing gun in which the cover moves through one path during its opening movement and in which the shock absorbing mechanism includes a member movable in another path, with means for transmitting the cover opening forces solely along said other path.

Other objects and advantages will be apparent from the following specification in which certain preferred embodiments of the invention are described with particular reference to the accompanying drawings. In these drawings:

Fig. 3 is an enlarged partial view of certain portions of the cover and shock absorber assemblies at their moment of initial engagement;

Fig. 4 is a view similar to Fig. 3 after the parts have moved through a portion of their shock absorbing cycle;

Fig. 5 is an enlarged partial sectional view of a preferred form of shock absorbing cylinder according to the present invention, with the parts in the normal cooking position of the gun;

Fig. 6 is a view similar to Fig. 5 with the parts in the firing or unloading position of the gun and with the shock absorbing cycle underway;

Fig. 7 is a view similar to Fig. 5 showing the parts in the position occupied when the gun is tilted to its loading or recharging position; and Fig. 8 is a view similar to Fig. 5 showing the parts after the loading operation is completed and during the start of the subsequent cooking operation.

Figure 1:
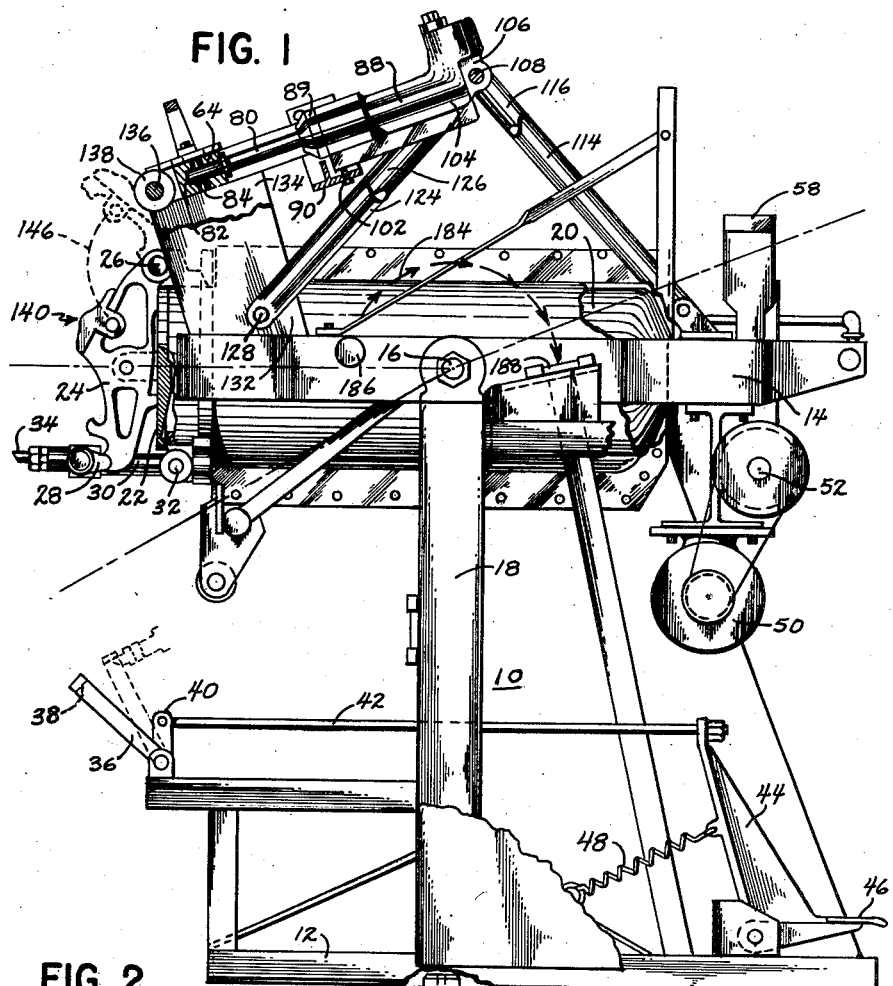
Figure 1 shows a complete puffing gun incorporating features of the present invention, the gun being shown in side elevation with certain portions broken away for clearness.
Figure 2:
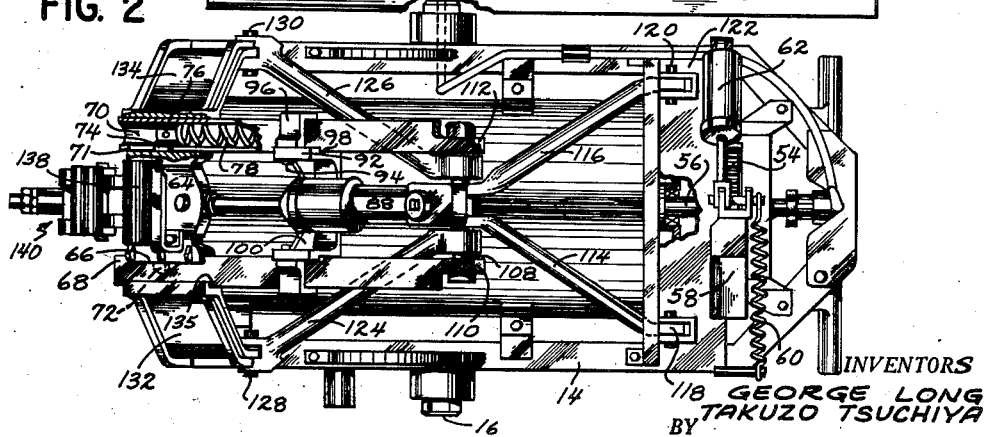
Fig. 2 is a top view of the device of Fig. 1.

As indicated in Figs. 1 and 2, the puffing gun according to the present invention includes a frame indicated generally at 10. This frame includes a stationary base 12 and a movable frame portion 14. The movable frame portion is pivoted at 16 on suitable pedestals 18 carried by the base. Pivot 16 provides for tilting of the frame 14 to the desired positions, which in the present case include the normal or cooking position, a firing or discharge position, and a loading or recharging position.

Mounted within the movable frame 14 is the puffing gun barrel indicated at 20. The barrel is rotatably mounted in known manner and its cooking position is shown in Fig. 1 wherein the axis of the barrel is essentially horizontal.

Operatively associated with the barrel is a removable cover 22 adapted to seal the open end of the barrel during the cooking operation. Cover 22 is carried by the cover support or lever 24 which is pivoted at 26 at one side of the puffing gun barrel. A locking link 28 is adapted to engage the free end of lever 24 to hold the parts in the assembled position shown in Fig. 1 in which the cover is locked on the barrel. Locking link 28 is pivoted to a locking lever 30 rotatably mounted at 32 on the barrel 20 diametrically opposite pivot 26. Locking link 28 and lever 30 provide a toggle locking combination adapted to hold the cover firmly in positoin during the cooking operation.

When the cooking operation is completed, the frame member 14 and barrel 20 are tilted to a firing position indicated by the downwardly inclined center line extending from pivot 16 in Fig. 1. In this firing position, the locking lever 30 will be located in the dotted line position shown in the figure so that the tip 34 of this lever is adapted for engagement by a firing or unlocking member 36. In this case member 36 is a pivoted lever and carries a hook 38 adapted to engage above the end 34 of lever 30, when the firing lever 36 is moved from the heavy line to the dotted line position of Fig. 1. Such movement is achieved by the lever arm and link combination shown in 40, 42, and 44. Lever arm 44 is associated with a foot pedal 46 and a return spring 48 which normally urges the parts to the heavy line position of Fig. 1.

With the gun in the firing position, operation of the foot pedal 46 will move the firing lever 36 to the dotted line position of Fig. 1. Angular movement of the gun back toward its horizontal cooking position will then release the cover-locking levers, since the end 34 of lever 30 will be held downwardly by lug 38. The resulting relative movement of the locking link 28 will then release the cover arm 24 and permit this arm and the associated cover to swing violently upward through a circular path determined by the location of pivot 26.

It is customary in such puffing guns to provide means for rotation of the gun barrel during the operation. In this case the rotation is provided by a motor 50 connected by suitable pulleys and belt to a cross shaft 52. This shaft includes a suitable worm engaging a driving gear 54 (Fig. 2) on the rotary shaft 56 of the gun barrel 20. A puffing gun of this general type is shown in Hayden Patent 2,279,868, assigned to the same assignee as the present invention.

In order to locate the parts easily in the desired angular position shown in Fig. 1, wherein the locking lever 30 will be at the lowermost portion of rotation of the gun barrel for engagement by the firing arm portion 38, some form of stopping or indexing mechanism may be provided. Such mechanism is indicated generally at 58 and may include a movable latch support 58 and suitable shock absorbing means such as spring 60 and cylinder assembly 62. Specific portions of this particular indexing mechanism are described and claimed in the co-pending application of Long and Rustad, Serial No. 557,072, filed of even date herewith, and assigned to the same assignee as the present invention. Other types of indexing mechanism could be used with the devices of the present invention, or the parts could be positioned by manual operation prior to the opening of the cover.

The shock absorber assembly which forms a part of the present invention includes a shock member 64 mounted for movement back and forth along a predetermined path. For this purpose the shock member 64 includes guide flanges 66 which slide along spaced parallel guide members 68 and 70 which are in alignment along the desired path. Guide members 68 and 70 are hollow and include longitudinal slots 71 into which projections 72 and 74 on the sliding shock member 64 project. These projections or lugs support spring blocks 76 which engage the ends of parallel springs 78. The other ends of the springs are constrained within the ends of the hollow guides 68 and 70 in known manner so that the springs will tend to compress and resist movement of the shock member 64 toward the right in Figs. 1 and 2. The springs will also normally urge the shock member 64 back toward the left in these figures to the heavy line position shown in the drawings.

The shock member 64 is secured to the rod end of a piston rod 80 which projects into a recess 82 in the shock member. A vertical pin 84 locks the piston rod and shock member together. A piston 86 (Figs. 5 to 8) is secured to the other end of the piston rod 80 and is adapted for longitudinal movement along the desired path within a shock cylinder 88.

A first end 89 of this shock cylinder rests by gravity contact on the positioning screw 102 of a cross bracket 90 provided with flanges 92 adapted to fit firmly against the guides 68 and 70. Retaining brackets 96 cooperate with the portions 92 to clamp this portion of the assembly firmly on the guides. Portions 92 may be recessed as shown at 98 to maintain the desired alignment of the cross bracket 90 and the desired spacing of the guide members.

The other end 104 of cylinder 88 is secured in position so that the axis of the cylinder lies along the desired path. For this purpose the cylinder is provided with a narrow end portion 106 which projects beyond the end of the cylinder and is engaged by a cross bar 108 which supports this portion of the mechanism. Cross bar 108 also passes through the ends 110 and 112 of the guide members 68 and 70. Thus the shock cylinder 88 is firmly positioned at end 104 and supported by screw 102 with its axis along the desired path of movement of the shock member 64.

To hold the cross bar 108 and the upper ends of the guides in this desired position four connecting or frame members are provided. Two of these frame members 114 and 116 have their upper ends secured to the cross bar 108 immediately adjacent the narrow cylinder portion 106. Their lower ends are secured at 118 and 120 to suitable brackets on a laterally extending portion 122 of frame 14. The other two supporting frame members 124 and 126 also have their upper ends secured to cross bar 108 between the respective upper ends of members 114 and 116 and the guides. Their lower ends are secured at 128 and 130 to upwardly projecting supporting brackets 132 and 134 at the other end of frame 14. The upper ends of brackets 132 and 134 also support the remaining ends of the guides 68 and 70 as indicated at 135.

These frame members accordingly provide a firm connection between the frame portion 14 and the shock assembly which is supported by and includes guides 68 and 70. The ends of the supporting connections 114, 116, 124, and 126 are all pin supported to avoid bending stresses on these frame elements. Their point of attachment to the cross bar 108 is as close as possible to the path of movement of the piston rod 80 along the line determined by the guides. At the same time the lower ends of these connecting and supporting members are spaced outwardly near the strongest portions of the main frame 14.

The shock member 64 is provided with means constituting an impact face adapted for engagement by suitable striking surfaces associated with the cover and cover arm 24. For this purpose the shock member carries a cross bar 136, preferably of circular cross section. Mounted on this cross bar is an annular sleeve 138 of resilient material such as rubber. Rod 136 is loosely mounted for rotation on its own axis in member 64, so that different portions of the sleeve will be engaged during successive impacts by virtue of the details of construction described below.

The surface of the sleeve 138 is adapted for engagement by a striking surface 140 which is suitably formed on a member 142 secured at 144 (Figs. 3 and 4) to the cover-supporting arm 24. Member 142 with its striking surface indicated generally at 140 will thus move in a predetermined path which in this case will be a circular arc having its center at the axis of pivot 26.

Fig. 3 shows the parts in the position assumed during movement of the cover arm 24 and striking surface 140 along its circular path to the point of initial engagement of the striking surface against the impact surface provided by resilient sleeve 138. Sleeve 138 and its associated parts, including shock member 64, are adapted to move along the predetermined path previously described, which is determined by the orientation and location of the guide members 68 and 70. For convenience, this path is designated by the reference 148 in Figs. 3 and 4. This path coincides with the axis of piston rod 80.

This second path 148 is different from the first path 146. The fixed location of pivot 26 at a point spaced from path 148 provides for different areas of intersection of surface 140 with the path, at different radial distances from pivot 26. One important feature of the present invention is accordingly the provision of a particular configuration for the striking surface 140.

The preferred form of striking surface is what might be called an involute curve generated by a point on a straight line as it is rocked on the base circle 146. In the preferred arrangement shown in the drawing, this point represents the point of tangency of path 148 to the base circle or path 146. This point substantially coincides with the point of first impact or contact between surface 140 and the periphery of the resilient sleeve 138. Surface 140 is thus defined so that any line perpendicular to the surface in the plane of circle 146 will always be tangent to this circle. Since the path of shock member 64 and the axis of cylinder 88 are also tangent to base circle 146, the involute surface 140 will always be perpendicular to path 148 at the points or areas of engagement between the surface and the sleeve 138. The impact forces will thus always be directed along path 148.

Thus in a sense, the involute surface 140 may be thought of as including a plurality of surface areas, each of which is perpendicular to the path 148 at the point where such area is adapted to intersect said path. Thus the portion of surface 140 indicated at 150, which represents the first point of engagement of surface 140 with sleeve 138 is in alignment with and perpendicular to the path 148. As the cover swings further open under the force of the pressures released within the cylinder, successive surface areas 152 and 154 will gradually move into the positions of intersection with path 148. As shown in Fig. 4 the surface area 152 is perpendicular to path 148 at its point of engagement or intersection with such path. Similarly the area of surface 154 will be perpendicular to path 148 when the cover arm 24 swings somewhat farther to the right to bring this area into engagement with sleeve 138 and path 148. The surface 140, made up of surface areas 150, 152, and 154 and the like will thus present a successively different area at the point of intersection with path 148 and substantially all of these surface areas will be perpendicular to path 148 and will thus transmit forces solely along said path. The surfaces will also provide rolling engagement with the sleeve 138 to rotate the sleeve in the direction of the arrows (Figs. 3 and 4) during the shock absorbing movement of the parts from Fig. 3 to Fig. 4 and beyond.

While the preferred arrangement involves the paths defined above, in which the shock absorber path is a straight line tangent to the base circle path of cover opening movement, the principles may have application to other paths, as long as the striking surface always presents areas perpendicular to the path of the impact member of the shock absorber.

According to another feature of the invention, the initial area of contact at 150 is preferably slightly modified from the exact "involute" surface described above. Because of the substantial shock forces to be transmitted at the initial moment of engagement, a convex or absolutely flat surface might have the tendency to split the resilient sleeve 138 at this point. To distribute the impact forces over slightly greater area at the initial moment of impact, this initial impact area 150 may be made of somewhat concave cylindrical shape. Fig. 4 illustrates in dotted lines at 156 the true involute surface as it would be presented without this concave area. The concave cylindrical area 150 thus represents a modification of the involute surface at the point of initial impact and this concave area, as indicated above, is of cylindrical configuration with the axis of the cylinder parallel to the cross rod 136 on the shock member and with the radius corresponding to the outer diameter of sleeve 138. While this modification might seem to present a slight hump between areas 150 and 152, we believe that the initial impact will provide a slight bounce which may momentarily separate surfaces 140 and 138. The cover continues to open during this bounce or separation and will reengage the surface 140 and sleeve 138 almost immediately at area 152. Thus for all practical purposes the surface 140 is substantially a true involute surface. In other words, the concave area presents a striking surface that directs the resultant impact force along the path of the impact member at substantially all points of engagement along said path.

The above construction thus provides for transmission of forces from the cover arm 24 and its striking surface 140 to the shock member 64 and its impact portions 136 and 138 with an absolute minimum of lateral bending or torsional components. The configuration of surface 140 at all times transmits forces to the shock member 138 directly along the path 148. The remaining parts of the shock assembly are so constituted as to resist these forces as directly as possible and absorb and dissipate the kinetic energy of the lid members. The mounting of the shock member 64 on longitudinal guides so that it is free for movement substantially only along this path also insures direct transmission of forces in the desired manner.

According to another feature of the invention, an improved construction of the shock absorbing cylinder 88 is provided. This cylinder is shown in cross section in Fig. 5 in the angular position which it occupies when the puffing gun assembly is in the normal cooking position of Fig. 1. In this position, the first end 89 of the shock cylinder 88 is lower than the second end 104 of the cylinder. The inside of member 88 provides a hollow cylindrical chamber 158 in which the piston 86 is adapted to slide between the first and second ends of the cylinder.

Associated with the cylinder is a reservoir including a chamber 160. While the reservoir might be formed from separate pieces of material, it is conveniently constructed as an integral part of the cylinder body 88. The cylinder and reservoir are adapted to be filled through a plug 161 with a suitable damping fluid which may consist of oil or the equivalent. This damping fluid is shown at 162 and sufficient fluid is incorporated to completely fill the cylinder and associated parts in the position of Fig. 5 up to the level indicated at 164 in this figure.

The cylinder assembly includes a number of passages for venting and for flow of the damping fluid between cylinder and reservoir during the shock-absorbing and return movements of the unit. The first of these passages is indicated at 166. This passage serves as a venting means between the upper end of the second cylinder end and the upper portion of the reservoir chamber 160 in the position of Fig. 5. Thus the lower end of passage 166 opens at 168 in the top of the cylinder, while the other end of passage 166 opens at 170 into the reservoir, preferably above the normal liquid level 164 in the reservoir.

A second communicating passage is provided between the cylinder and reservoir as indicated at 172. The upper end of this passage opens at 174 into the lowermost region of the reservoir chamber 160. The other end of passage 172 communicates at 176 with the bottom of the cylinder, specifically at the bottom of the first or lower end of the cylinder.

The piston and cylinder assembly also includes means providing for flow of the damping fluid from the second end of the damping cylinder back toward the first end during shock-absorbing movement of the piston 86 from the first end to the second end. While various means may be used for this purpose, the drawing illustrates a preferred form in which a third passage 178 is provided in the form of a recess in the cylinder wall. This recess cooperates with the remaining cylinder portions and with the piston 86 to provide a passageway of predetermined cross section by which fluid may pass around the piston during the movement of the latter from one end of the cylinder to the other. In order to provide a substantially constant resistance to such flow as the shock-absorbing movement progresses at gradually decreasing velocity until the energy is dissipated, the passage 178 is provided with a gradually changing cross section. This cross section is a maximum at the first end of the cylinder as shown at 180. The recess then tapers gradually to a minimum depth toward the other end of the cylinder as indicated at 182. In the form shown in Fig. 5, the end 180 of restricted passage 178 communicates with the first end of the cylinder at the same point as the end 176 of passage 172.

The operation of this cylinder assembly is as follows. When the puffing gun cover is to be opened, the gun is tilted in the manner previously described to the dotted line position of Fig. 1. This movement also tilts the associated cylinder assembly from the position of Fig. 5 to the position of Fig. 6. In the latter position, the cylinder is much more steeply inclined and the vertical separation between the first and second ends of the cylinder is even greater than in the normal cooking position of Fig. 5. The relative location and orientation of the reservoir chamber 160 is such that in this firing or opening position of the puffing gun, all portions of the reservoir are still located at a higher level than the portions of the cylinder. Thus the quantity of damping fluid which was provided in Fig. 5 in order to completely fill the cylinder and associated passages up to the level 164 will still provide a completely filled cylinder in the position of Fig. 6.

The position of the piston in Fig. 6 has been shown at the location reached during its maximum shock-absorbing movement. It will be understood that the piston has moved from the position of Fig. 5 to the position of Fig. 6 very rapidly under the influence of the impact of the lid involute surface 140 with 138 of member 64. During the first part of this movement the damping fluid flows at high volume through the by-pass 178 back to the first end of the cylinder. During the later portion of the piston movement, the available passageway is more restricted and constant resistance to the opening movement of the cover is maintained at the lower piston velocity and low flow volume of damping fluid.

Throughout such movement, some of the damping fluid is continually forced through the vent passage 166 up into the reservoir. The cross section of this passage is so restricted, however, that the amount of fluid transferred in this manner is negligible during the impact cycle.

Once the cover is open, the puffing gun will be tilted to the loading position, which is shown in Fig. 1 by the upwardly inclined dotted line extending from pivot 16. The gun will thus be tilted from the firing position up to the horizontal cooking position and then on through the path shown by the arrows 184 in Fig. 1 until a pin 186 engages a stop 188 on the stationary pedestal 18. In this position the open end of the puffing gun will be higher than the closed end to facilitate filling of the gun assembly with more material to be cooked and puffed.

In this loading position of the assembly, the shock absorber cylinder unit will be in the position of Fig. 7. The actions of the return springs 78 in the shock absorber assembly will, however, gradually urge the piston 86 back from the second end of the cylinder toward the first end. During this movement, as shown by the arrows in Fig. 7, some damping fluid will be sucked up through the vent passage 166. Because of the restricted cross section of this venting passage 166, however, there will be a greater tendency for some of the fluid to be sucked through the larger passage 172 as the piston moves back to the first end of the cylinder. Because of the nature of the open recess 178 and because this recess is located above the piston in the loading position of Fig. 7, a point may be reached at which the suction is broken and fluid may in effect drop back through passages 172 and 166 to fill the reservoir.

After the gun is reloaded, it will be moved back to the cooking position of Fig. 1 in which the damping cylinder will assume the orientation shown in Fig. 8. Here the higher relative location of the reservoir will provide prompt drainage of damping fluid through passages 172 and 178 into the cylinder chamber 158. At this time the vent passage 166 will prevent air from being trapped within cylinder 158 and will permit such air to pass upwardly into the top portion of reservoir 160. This combination of the large liquid passage 172 and restricted vent passage 166 thus insures return flow of damping fluid from reservoir to cylinder unit the cylinder is completely filled with no air pockets before the next shock absorbing cycle. Thus the cylinder will be ready for a repetition of the shock absorbing cycle at the end of the next cooking period and with no air pockets to decrease the available effective damping fluid in the cylinder.

The mechanism described above substantially accomplishes the objectives set forth at the beginning of this application and reduces failures and maintenance problems on puffing gun assemblies to an absolute minimum. Since minor variations and changes in the exact details of construction will be apparent to persons skilled in this field, it is intended that this invention shall cover all such changes and modifications as fall within the spirit and scope of the foregoing description and the attached claims.

Now, therefore, we claim:

1. A puffing gun having a cooking body, a removable cover for said body, means supporting the cover for rapid movement along a first path between closed and open positions on said body when the cover is unlocked to release the cooking pressure within the body, and a shock absorber assembly including a shock member adapted for shock absorbing movement along a second path, and a striking surface operatively movable with said cover along said first path and adapted to engage said shock member and urge the latter along said second path during opening of the cover, said striking surface having an involute shape presenting a surface perpendicular to said second path at substantially all points of engagement with the shock member along said path.

2. A puffing gun according to claim 1 in which said first path is a circular arc and said second path is a straight line tangent to said arc.

3. A puffing gun according to claim 2 having a frame, means supporting the cooking body for relative rotation on the frame, and means mounting the shock absorber assembly on the frame including a straight guide member fixed on the frame along said second path, said shock member being supported for sliding movement along said guide.

4. In a puffing gun having a barrel, a removable cover for the barrel and means supporting the cover for relative rotation about a given axis between open and closed positions on the barrel, the improvement comprising a shock absorber assembly including a shock member having an impact receiving face, means supporting said shock member for shock-absorbing movement along a straight-line path displaced from said given axis, and a striking surface operatively movable with said cover and adapted to engage said face and urge the shock member along said path during opening movement of the cover, said striking surface having an involute shape presenting a surface perpendicular to said path at substantially all points of engagement between said striking surface and shock member face during movement of the shock member along the path.

5. A puffing gun according to claim 4 in which said shock member includes a round rod extending laterally across said path, and a resilient annular buffer enclosing said rod, the cylindrical surface of said buffer constituting said impact receiving face.

6. A puffing gun according to claim 5 in which said involute striking surface is modified by the provision of a laterally extending cylindrical depression parallel to said rod and located at the area of initial engagement of the striking surface and impact receiving face, said depression providing an initial striking surface that directs the resultant initial impact force along said second path, and the remaining portions of said involute surface providing a striking surface that directs the resultant impact force along said second path at substantially all remaining points of engagement along said path.

7. A puffing gun according to claim 5 in which said buffer is freely rotatable on said rod, engagement of successive portions of said involute striking surface during each cover-opening impact thereby rotating said buffer on the rod and distributing wear from repeated cover-opening impacts throughout the circumference of the buffer.

8. A puffing gun according to claim 4 including a shock cylinder supported with its axis along said path, a piston within the cylinder connected to said shock member and adapted to move along said path from one end of the cylinder toward the second end during opening movement of the cover, a reservoir at the second end of the cylinder, damping fluid in the cylinder, conduit means through which said fluid is forced from cylinder to reservoir during said opening movement, the relative orientation and location of said path, cylinder and reservoir positioning at least a portion of the reservoir higher than the cylinder in the normal cooking position of said gun, and venting means connecting the upper portions of said cylinder and reservoir in said cooking position and thereby preventing airlocks during return flow of fluid from reservoir to cylinder.

9. In a puffing gun having a cooking barrel, a removable cover assembly for said barrel, and a shock absorber assembly adapted for engagement by the cover assembly to cushion the opening movement of the cover, the improvement comprising a shock cylinder adapted to be filled with damping fluid and having a piston movable axially therein, said piston being connected for movement from a first end of the cylinder toward the second end during opening movement of the cover, means supporting the cylinder on the gun with its first end lower than its second end when the gun is in normal cooking position, a reservoir operatively connected with the cylinder, the bottom of said reservoir being located at a level higher than the top of the cylinder in said cooking position, venting means including a first passage of relatively small cross section extending from the upper portion of the second cylinder end to the upper portion of said reservoir in said cooking position, and fluid conduit means including a second passage of relatively large cross section extending from the bottom of said reservoir to the bottom portion of the first cylinder end, the location of said first and second passages insuring complete flow of damping fluid from the reservoir to fill the cylinder when the piston is at said first end and the parts are in said cooking position.

10. A puffing gun according to claim 9 in which said reservoir is located at the second end of the cylinder.

11. A puffing gun according to claim 10 in which the gun is mounted for movement to a firing position in which the relative orientation of said cylinder is changed, substantially all portions of said reservoir being also located at a level higher than the uppermost portion of said cylinder in said firing position.

12. A puffing gun according to claim 9 in which said cylinder and piston include means providing a third passage for restricted fluid flow from the second end to the first end of the cylinder during shock absorbing movement of the piston from said first end to the second end.

13. A puffing gun according to claim 12 in which said third passage means consists of an axially extending recess in the wall of said cylinder, said recess having a decreasing cross section from the first to the second end of the cylinder, and thereby cooperating with the piston to provide constant resistance to fluid flow as the piston moves toward the second end.

14. A puffing gun according to claim 13 in which said recess is located at the bottom of the cylinder and connects directly with said second passage at the first cylinder end.

References Cited in the file of this patent

UNITED STATES PATENTS

| | | |
|---|---|---|
| 1,831,601 | Le Valley | Nov. 10, 1931 |
| 2,279,868 | Hayden | Apr. 14, 1942 |

FOREIGN PATENTS

| | | |
|---|---|---|
| 536,315 | Great Britain | May 9, 1941 |